(12) United States Patent
Suszynsky

(10) Patent No.: US 8,262,106 B1
(45) Date of Patent: Sep. 11, 2012

(54) OXYGEN TANK HOLDER

(76) Inventor: Karol T. Suszynsky, Winston Salem, NC (US)

(*) Notice: Subject to any disclaimer, the term of this patent is extended or adjusted under 35 U.S.C. 154(b) by 496 days.

(21) Appl. No.: 12/540,998

(22) Filed: Aug. 13, 2009

(51) Int. Cl.
B62B 1/00 (2006.01)

(52) U.S. Cl. ............ 280/47.131; 280/47.17; 280/47.24; 280/47.26; 280/79.6; 280/79.7

(58) Field of Classification Search ............... 280/47.17, 280/47.24, 47.26, 47.315, 47.33, 47.371
See application file for complete search history.

(56) References Cited

U.S. PATENT DOCUMENTS

| | | | |
|---|---|---|---|
| 2,654,493 A | 10/1953 | Kernkamp | |
| 3,998,476 A * | 12/1976 | Kazmark, Sr. | 280/655 |
| 4,062,564 A * | 12/1977 | Schimmeyer | 280/652 |
| 4,506,903 A * | 3/1985 | Bowermaster | 280/304.1 |
| D302,063 S | 7/1989 | Frazier et al. | |
| 5,071,148 A * | 12/1991 | Salvucci, Sr. | 280/47.24 |
| D342,222 S | 12/1993 | Cherry | |
| 5,658,118 A | 8/1997 | Luca | |
| 5,769,440 A * | 6/1998 | Jones | 280/204 |
| 5,971,424 A | 10/1999 | Ingalls | |
| 6,799,769 B2 | 10/2004 | Ziolkowski | |
| 2004/0129305 A1* | 7/2004 | Hamilton et al. | 135/67 |
| 2007/0063469 A1 | 3/2007 | Blum et al. | |

* cited by examiner

Primary Examiner — Hau Phan
Assistant Examiner — Bryan Evans

(57) ABSTRACT

An oxygen tank holder that is mobile and could be wheeled around by a patient as needed or when attached to a wheelchair. The oxygen tank holder includes a base mounted on a skeletal framework, with the framework including a pair of wheels that are connected by a central axle. The oxygen tank is held on the base by a pair of straps, with the oxygen tank holder being moved around with the help of a handle attached to the framework or propelled when attached to a wheelchair. A band and a stabilizer bar with a pair of mounting bolts at each end secure the holder to a wheelchair.

7 Claims, 4 Drawing Sheets

OXYGEN TANK HOLDER

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

The present invention concerns that of a new and improved oxygen tank holder that is mobile and could be wheeled around by a patient as needed.

SUMMARY OF THE INVENTION

The present invention concerns that of a new and improved oxygen tank holder that is mobile and could be wheeled around by a patient as needed or attached to wheelchair. The oxygen tank holder includes a base mounted on a skeletal framework, with the framework including a pair of wheels that are connected by a central axle. The oxygen tank is held on the base by a pair of straps, with the oxygen tank holder being moved around with the help of a handle attached to the framework. A band having an outer end formed of hook and loop fastening secures the oxygen tank holder to a wheelchair. The band is attached to the handle of the upper end of the lower telescoping bar. A pair of mounting bolts disposed near each outer edge of the stabilizer bar further secures the oxygen tank holder to a wheelchair frame.

There has thus been outlined, rather broadly, the more important features of an oxygen tank holder that the detailed description thereof that follows may be better understood and in order that the present contribution to the art may be better appreciated. There are, of course, additional features of the oxygen tank holder that will be described hereinafter and which will form the subject matter of the claims appended hereto.

In this respect, before explaining at least one embodiment of the oxygen tank holder in detail, it is to be understood that the oxygen tank holder is not limited in its application to the details of construction and to the arrangements of the components set forth in the following description or illustrated in the drawings. The oxygen tank holder is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present oxygen tank holder. It is important, therefore, that the claims be regarded as including such equivalent constructions insofar as they do not depart from the spirit and scope of the present invention.

It is therefore an object of the present invention to provide an oxygen tank holder which has all of the advantages of the prior art and none of the disadvantages.

It is another object of the present invention to provide an oxygen tank holder which may be easily and efficiently manufactured and marketed.

It is another object of the present invention to provide an oxygen tank holder which is of durable and reliable construction.

It is yet another object of the present invention to provide an oxygen tank holder which is economically affordable and available for relevant market segment of the purchasing public.

Other objects, features and advantages of the present invention will become more readily apparent from the following detailed description of the preferred embodiment when considered with the attached drawings and appended claims.

DESCRIPTION OF THE PREFERRED EMBODIMENT

Figure 1:
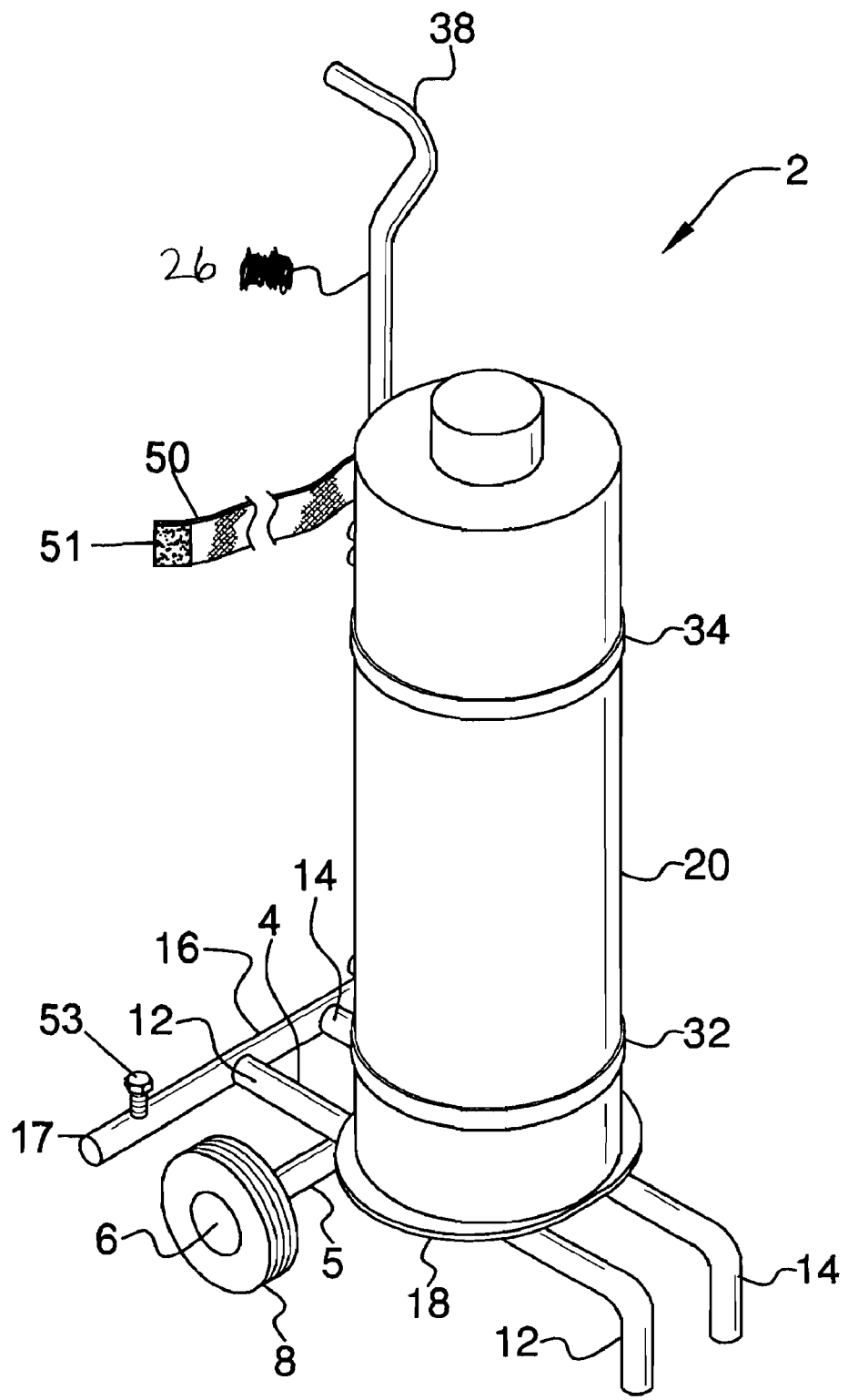
FIG. 1 shows a front perspective view of the oxygen tank holder with a mounted oxygen tank.
Figure 2:
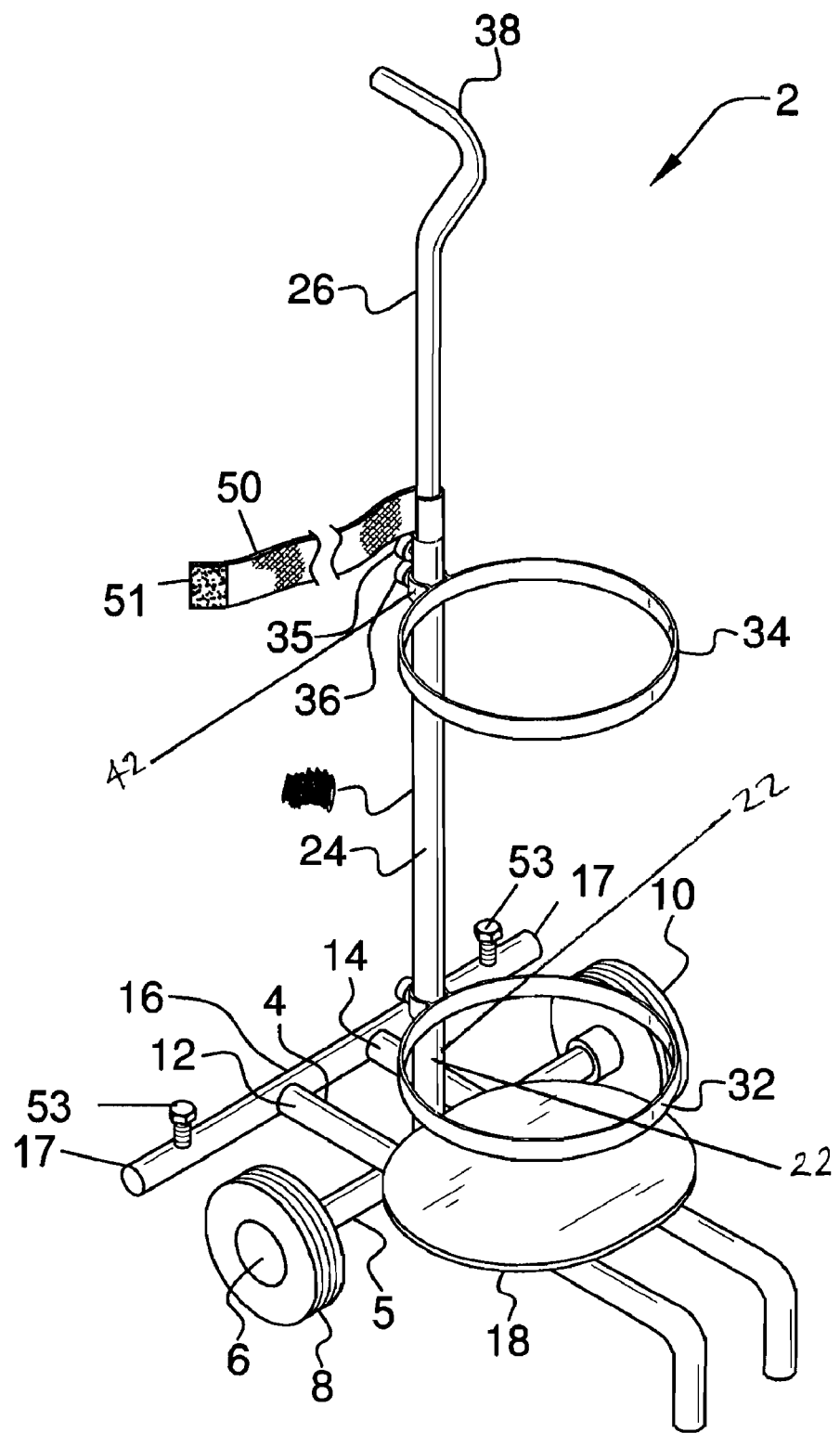
FIG. 2 shows a front perspective view of the oxygen tank holder after the oxygen tank has been removed from the base.
Figure 3:
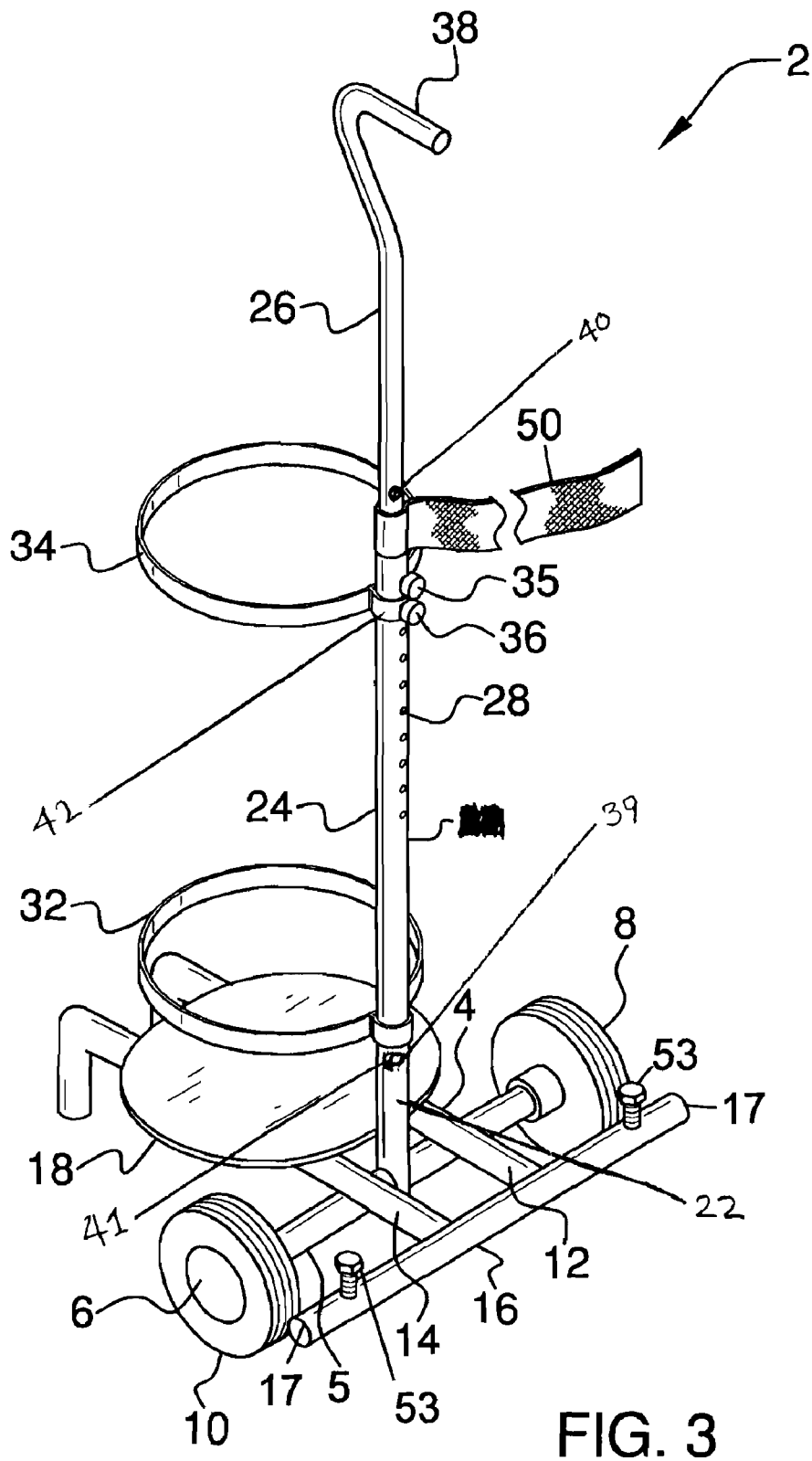
FIG. 3 shows a rear perspective view of the oxygen tank holder after the oxygen tank has been removed from the base.
Figure 4:
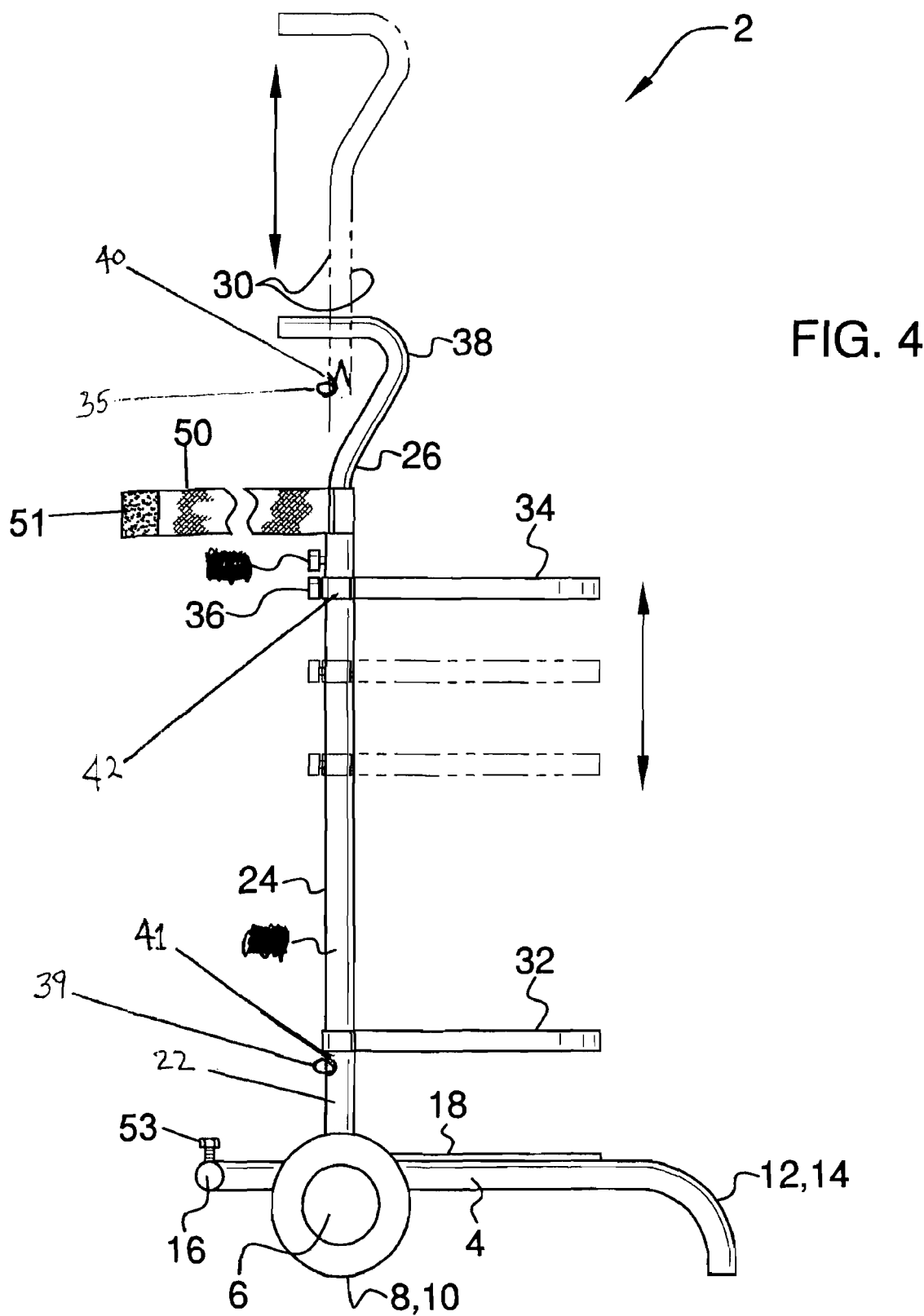
FIG. 4 shows a side perspective view of the oxygen tank holder after the oxygen tank has been removed from the base.

With reference now to the drawings, and in particular to FIGS. 1 through 4 thereof, an oxygen tank holder embodying the principles and concepts of the present invention and generally designated by the reference numeral 2 will be described.

As best illustrated in FIGS. 1 through 4, the oxygen tank holder 2 comprises an underlying framework 4, with the framework 4 comprising an axle covering 5. A pair of wheels 8 and 10 are attached to an axle 6 that is located within the axle covering 5 and allow the oxygen tank holder 2 to be moved around as needed.

A pair of support bars 12 and 14 are attached to the axle covering 5 and each has two ends comprising a first end and a second end. The first end of each of the support bars 12 and 14 are attached to a stabilizer bar 16, which stabilizer bar 16 attaches to the wheelchair frame, while the second end of each of the support bars 12 and 14 are curved downward and serve as additional support legs for the oxygen tank holder 2 when it is not be moved around.

A platform 18 is mounted on top of the support bars 12 and 14, with the platform 18 preferably being circular in nature. An oxygen tank 20 is designed to be placed on the platform 18 when the oxygen tank holder 2 is in use.

The oxygen tank holder 2 also has a telescoping handle 22 that is attached to the axle covering 5 and support bars 12 and 14 and comprises a lower telescoping bar 24 and an upper telescoping bar 26. The lower end of telescoping handle 22 is fixedly mounted to the axle covering 5 and support bars 12 and 14 and has two ends comprising a lower end and an upper end which are hollow. The upper end of telescoping handle 22 receives the lower end of lower telescoping bar 24. The lower telescoping bar 24 is hollow with the upper end of the lower telescoping bar 24 being open. The upper telescoping bar 26 has two ends comprising an upper end and a lower end, with the lower end of the upper telescoping bar 26 is capable of being insertable into the upper end of the lower telescoping bar 24. The outer diameter of the lower telescoping bar 24 is slightly bigger than the inner diameter of the lower telescoping bar 24.

The lower telescoping bar 24 has a plurality of holes 28 on it that are linear in nature. The distance between two successive holes 28 on the lower telescoping bar 24 are the same. An individual can place the telescoping handle 22 at a particular height by moving the upper telescoping bar 26 in relation to the lower telescoping bar 24.

The oxygen tank holder also has a pair of straps that can be used to help ensure that the oxygen tank 20 will stay mounted on the platform 18 once so placed. A stationary strap 32 is attached to the lower telescoping bar 24 and is a pliable strap located anywhere between four to eight inches above the level of the platform 18. The other strap comprises an adjustable strap 34, which is attached to the upper end of lower telescoping bar 24, with the adjustable strap 34 being adjustable through the use of an adjustment knob 36, which is attached to the adjustable strap 34. Once an oxygen tank 20 has been placed within the oxygen tank holder 2, the adjustable strap 34 is located near the top of the oxygen tank 20.

The upper telescoping bar 26 also has an end-mounted handle 38, with the handle 38 allowing an individual to easily grasp the oxygen tank holder 2 and move it around as needed on the pair of wheels 8 and 10.

In addition, a band 50 having an outer end 51 formed of hook and loop fastening secures the oxygen tank holder 2 to a wheelchair. The band 50 is attached to the handle 38 of the upper telescoping bar 26. A pair of mounting bolts 53 disposed near each outer edge 17 of the stabilizer bar 16 further secures the oxygen tank holder 2 to a wheelchair.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What I claim as my invention is:

1. An oxygen tank holder comprising
a framework comprising:
   a transverse axle;
   an axle covering disposed on the axle;
   a pair of support bars centrally disposed atop the axle, the support bars disposed in a position parallel to each other and perpendicular to the axle, wherein the support bars comprise a first support bar and a second support bar, wherein each of the support bars has two ends comprising a first end and a downwardly curved second end, wherein the first end is more proximal to the axle than the second end;
a pair of wheels comprising a first wheel and a second wheel, wherein each of the wheels of the pair of wheels is attached to the axle;
a stabilizer bar continuously disposed in a position parallel to the axle, wherein the first end of each support bar is attached to the stabilizer bar, wherein the stabilizer bar has a length greater than a length of the axle;
wherein the stabilizer bar is configured to attach to a wheelchair frame;
a platform mounted atop the pair of support bars in a position between the axle and the second end of the support bars,
wherein the platform is configured to support an oxygen tank thereon.

2. The oxygen tank holder according to claim 1 further comprising
   (a) a telescoping handle attached to the axle covering and the pair of support bars, wherein the telescoping handle comprises an upper telescoping bar, further wherein the telescoping handle comprises a lower telescoping bar, wherein the lower telescoping handle is fixedly attached to the axle covering and pair of support bars and has two ends comprising a lower end and an upper end, the upper end of the lower telescoping handle being hollow wherein the upper telescoping bar has two ends comprising a lower end and an upper end, wherein the lower end of the upper telescoping bar being insertable into the upper end of the lower telescoping bar, and
   (b) means for mounting the upper telescoping bar at a specific height in relation to the lower telescoping bar.

3. The oxygen tank holder according to claim 2 wherein the means for mounting the upper telescoping bar at a specific height in relation to the lower telescoping bar further comprises
   (a) a first plurality of holes located on the lower telescoping bar,
   (b) one (1) hole located on the upper telescoping bar.

4. The oxygen tank holder according to claim 3 wherein the oxygen tank holder further comprises
   (a) a stationary strap attached to the lower end of the lower telescoping bar,
   (b) an adjustable strap attached to the upper end of the lower telescoping bar, and
   (c) means for adjusting the adjustable strap.

5. The oxygen tank holder according to claim 4 wherein the means for adjusting the adjustable strap further comprises
   (a) an adjustment knob attached to the adjustable strap,
   (b) wherein the adjustment knob is adjusted by sliding up or down on the lower telescoping bar,
   (c) further tightening the adjustment knob.

6. An oxygen tank holder comprising
a framework comprising:
   a transverse axle;
   an axle covering disposed on the axle;
   a pair of support bars centrally disposed atop the axle, the support bars disposed in a position parallel to each other and perpendicular to the axle, wherein the support bars comprise a first support bar and a second support bar, wherein each of the support bars has two ends comprising a first end and a downwardly curved second end, wherein the first end is more proximal to the axle than the second end;
a pair of wheels comprising a first wheel and a second wheel, wherein each of the wheels of the pair of wheels is attached to the axle;
a stabilizer bar continuously disposed in a position parallel to the axle, wherein the first end of each support bar is attached to the stabilizer bar, wherein the stabilizer bar has a length greater than a length of the axle;
wherein the stabilizer bar is configured to attach to a wheelchair frame;

a disc-shaped platform mounted atop the pair of support bars in a position between the axle and the second end of the support bars, a telescoping handle attached to the axle covering and pair of support bars, wherein the telescoping handle comprises an upper telescoping bar, further wherein the telescoping handle comprises a lower telescoping bar, wherein the lower telescoping handle is fixedly attached to the axle covering and pair of support bars has two ends comprising a lower end and an upper end, the upper end of the lower telescoping handle being hollow wherein the upper telescoping bar has two ends comprising a lower end and an upper end, wherein the lower end of the upper telescoping bar being insertable into the upper end of the lower telescoping bar, means for mounting the upper telescoping bar at a specific height in relation to the lower telescoping bar, said means further comprising (i) a first plurality of holes located on the lower telescoping bar, one hole located on the upper telescoping bar, a stationary strap attached to the lower end of the lower telescoping bar, an adjustable strap attached to the upper end of the lower telescoping bar, means for adjusting the adjustable strap, said means further comprising (i) an adjustment knob attached to the adjustable strap, (ii) wherein the adjustment knob is adjusted by sliding up or down on the lower telescoping bar, (iii) further tightening the adjustment knob.

7. An oxygen tank holder comprising a framework comprising:
 a transverse axle;
 an axle covering disposed on the axle;
 a pair of support bars centrally disposed atop the axle, the support bars disposed in a position parallel to each other and perpendicular to the axle, wherein the support bars comprise a first support bar and a second support bar, wherein each of the support bars has two ends comprising a first end and a downwardly curved second end, wherein the first end is more proximal to the axle than the second end;

a pair of wheels comprising a first wheel and a second wheel, wherein each of the wheels of the pair of wheels is attached to the axle;

a stabilizer bar continuously disposed in a position parallel to the axle, wherein the first end of each support bar is attached to the stabilizer bar, wherein the stabilizer bar has a length greater than a length of the axle;

wherein the stabilizer bar is configured to attach to a wheelchair frame;

a disc-shaped platform mounted atop the pair of support bars in a position between the axle and the second end of the support bars, a telescoping handle attached to the axle covering and pair of support bars, wherein the telescoping handle comprises an upper telescoping bar, further wherein the telescoping handle comprises a lower telescoping bar, wherein the lower telescoping handle is fixedly attached to the axle covering and pair of support bars and has two ends comprising a lower end and an upper end, the upper end of the lower telescoping handle being hollow wherein the upper telescoping bar has two ends comprising a lower end and an upper end, wherein the lower end of the upper telescoping bar being insertable into the upper end of the lower telescoping bar, means for mounting the upper telescoping bar at a specific height in relation to the lower telescoping bar, said means further comprising (i) a first plurality of holes located on the lower telescoping bar, (ii) one (1) hole located on the upper telescoping bar, a stationary strap attached to the lower end of the lower telescoping bar, an adjustable strap attached to the upper end of the lower telescoping bar, means for adjusting the adjustable strap, said means further comprising (i) an adjustment knob attached to the adjustable strap, (ii) wherein the adjustment knob is adjusted by sliding up or down on the lower telescoping bar, (iii) further tightening the adjustment knob, a band having an outer end formed of hook and loop fastening and attached to the handle of the upper end of the lower telescoping bar wherein the band secures the oxygen tank holder to a wheelchair, and a pair of mounting bolts disposed near each of an outer edge of the stabilizer bar wherein the mounting bolts further secure the oxygen tank holder to a wheelchair frame.

* * * * *